UNITED STATES PATENT OFFICE

KLAUS WEINAND, OF FLITTARD, NEAR COLOGNE-ON-THE-RHINE, GERMANY, ASSIGNOR TO GENERAL ANILINE WORKS, INC., OF NEW YORK, N. Y., A CORPORATION OF DELAWARE

HOMONUCLEAR AMINO-ALPHYLAMINO-ANTHRAQUINONE SULPHONIC ACIDS AND PROCESS OF MAKING THE SAME

No Drawing. Application filed August 18, 1926, Serial No. 130,112, and in Germany August 21, 1925.

My invention consists in novel dyestuffs which are homonuclear 1-amino-4-alkylamino-anthraquinone sulphonic acids and in processes of making the same.

It is well known that by acting with aromatic amines in presence of catalysts, such as copper powder or copper compounds, upon halogeno-hydroxy- or halogeno-amino-anthraquinone sulphonic acids the halogen atoms are replaced by arylamino groups. Homonuclear amino - arylamino - substituted anthraquinone sulphonic acids are described for instance in U. S. Letters Patent 1,131,516, dated March 9, 1915.

I have now found that by acting with aliphatic, open carbon chain amines, or alkylamines upon homonuclear 4-halogeno, particularly chloro and bromo, 1-amino-anthraquinone sulphonic acids new products are obtained which are homonuclear 4-alkylamino-1-amino-anthraquinone sulphonic acids.

The term homonuclear is used herein in its usual significance; that is to say, meaning all substituents located in the same benzene nucleus of the anthraquinone molecule, and the term alkyl designates a radicle in which the carbon atom attached to the amino nitrogen is a link in an open chain of carbon atoms, the methyl and methylene radicles being considered the lowest members in the series of open carbon chains. This type of alkyl radicles can be exemplified by methyl, ethyl, propyl, butyl, benzyl, etc. It is thus evident that the term alkyl is used in its generic sense to include those alkyl radicles having an aromatic substituting group.

This reaction proceeds easily in aqueous solution or suspension even at atmospheric pressure in presence of a copper catalyst, which may be metallic copper itself, mineral acid copper salts or other copper compounds.

The alkyl amines used in my novel process are much stronger bases than the aromatic bases used heretofore for substitutions in the anthraquinone nucleus, it was therefore quite unexpected that they would react predominently and selectively with the halogen atoms whereas the quite labile sulfo group in the molecule is substantially not attacked.

Amongst the products particularly suited to be used in my novel reaction I might mention the 1-amino-4-bromo-2-anthraquinone sulphonic acid and as very valuable products the 1-amino-4-alkylamino-2-anthraquinone sulphonic acids.

My novel compounds are blue colored, crystalline substances, soluble in water with the blue colors. The dye animal fibres blue, fast shades. They are distinguished from similar amino - arylamino - anthraquinone sulphonic acid by the much clearer and brighter shades they produce in the dyeing of wool.

The following examples will further illustrate my invention, the parts being by weight.

*Example 1.*—20 parts 1-amino-4-bromo-2-anthraquinone sulphonic acid, 12 parts soda ash and 1 part copper sulphate are dissolved at 70–80° C. in 1000 parts water and 60 parts n-butylamine is added. The solution is heated in an apparatus equipped with a reflux condenser to 80–90° C. The solution turns quickly an intense blue and the condensation is finished after about an hour's heating. The reaction mass is then acidified and the 1-amino-4-n-butylamino-2-anthraquinone sulphonic acid separates as blue, crystalline needles. It is isolated in the usual manner. It dyes wool particularly clear, greenish-blue shades and has most probably the formula

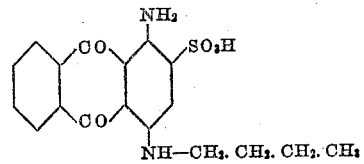

*Example 2.*—20 parts 1-amino-4-bromo-2-anthraqinone sulphonic acid, 12 parts soda ash, 1 part copper sulfate and 60 parts benzylamine are dissolved in a solution of 100 parts pyridine and 900 parts water, and heated for about one hour at 80–90° C. The reaction mass quickly turns blue, it is then acidified and the 1-amino-4-benzylamino-2-anthraquinone sulphonic acid separates. Instead of acidifying one can also steam off the pyridine and excess benzylamine and salt out the 1-amino-4-benzylamino-2-anthraquinone sulphonic acid. It crystallizes in blue needles and dyes wool particularly clear reddish-blue shades. It has most probably the formula:

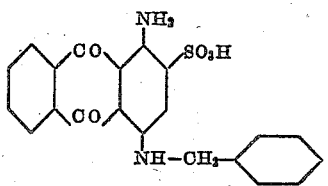

I claim:

1. The process of reacting with alkylamines in presence of a copper catalyst upon homonuclear 1-amino-4-halogeno-anthraquinone sulphonic acids.

2. The process of reacting with alkylamines in presence of a copper catalyst upon 1-amino-4-halogeno-2-anthraquinone sulphonic acid.

3. The process of reacting with alkylamines in presence of a copper catalyst upon 1-amino-4-halogeno-2-anthraquinone sulphonic acid in which the halogen is one of the group comprising chlorine and bromine.

4. The process of heating an aqueous solution of 1-amino-4-bromo-2-anthraquinone sulphonic acid with an alkylamine in presence of a copper catalyst.

5. The process of heating an aqueous solution of 1-amino-4-bromo-2-anthraquinone sulphonic acid with n-butylamine in presence of copper sulfate.

6. As new products homonuclear 1-amino-4-alkylamino-anthraquinone sulphonic acids, the alkyl-groups of which contain more than one carbon-atom, which are blue crystalline substances, dyeing wool particularly clear, blue shades.

7. As new products 1-amino-4-alkylamino-2-anthraquinone sulphonic acids, the alkyl-groups of which contain more than one carbon-atom, which are blue crystalline substances, dyeing wool particularly clear, blue shades and having most probably the formula:

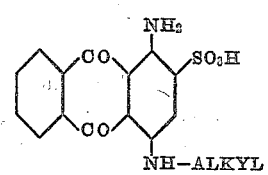

8. As a new product the 1-amino-4-n-butylmino-2-anthraquinone sulphonic acid, which crystallizes in blue needles, is soluble in water with a blue color, dyes wool particularly clear, greenish-blue shades and has most probably the formula:

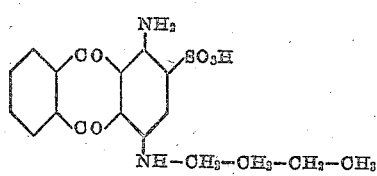

In testimony whereof, I affix my signature.

KLAUS WEINAND.